US010038333B2

(12) United States Patent
Condon et al.

(10) Patent No.: US 10,038,333 B2
(45) Date of Patent: Jul. 31, 2018

(54) METHODS AND DEVICES FOR INDUCTIVE COUPLING INTO POWER LINES

(71) Applicant: Google Inc., Mountain View, CA (US)

(72) Inventors: Kenneth Condon, Sunnyvale, CA (US); Xue Hai Fang, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 85 days.

(21) Appl. No.: 15/153,602

(22) Filed: May 12, 2016

(65) Prior Publication Data

US 2017/0331315 A1  Nov. 16, 2017

(51) Int. Cl.
| H02J 7/00 | (2006.01) |
| H04B 5/00 | (2006.01) |
| H04B 1/38 | (2015.01) |
| H02J 7/02 | (2016.01) |

(52) U.S. Cl.
CPC ............ H02J 7/025 (2013.01); H02J 7/0052 (2013.01); *H02J 2007/0059* (2013.01)

(58) Field of Classification Search
CPC .. H02J 7/025; H02J 7/0052; H02J 2007/0059; H02J 50/12; H02J 50/10; H02J 50/00; H02J 7/0044; H02J 17/00; Y02E 60/12; H01F 38/14; Y02T 90/122; B60L 11/182; G06K 19/0723; G06K 7/0008; H04B 5/02; H04B 5/0012; H04B 5/00; H04B 1/3883; H04M 19/08; H04M 1/04
USPC .................. 320/108; 455/41.1, 573
See application file for complete search history.

(56) References Cited

U.S. PATENT DOCUMENTS

| 2,553,734 | A | 5/1951 | Adler | |
| 3,723,818 | A | 3/1973 | Zocholl | |
| 5,323,099 | A | 6/1994 | Biasotti et al. | |
| 7,511,454 | B1 * | 3/2009 | Legg | H02J 50/12 |
| | | | | 320/108 |
| 8,441,364 | B2 | 5/2013 | Ben-Shalom et al. | |
| 8,618,695 | B2 | 12/2013 | Azancot et al. | |
| 2011/0084651 | A1 | 4/2011 | Caskey et al. | |
| 2013/0026981 | A1 * | 1/2013 | Van Der Lee | H02J 5/005 |
| | | | | 320/108 |
| 2017/0179750 | A1 * | 6/2017 | Oo | H02J 7/025 |

FOREIGN PATENT DOCUMENTS

| CN | 204651997 | 9/2015 |
| WO | 2012093398 A2 | 7/2012 |

* cited by examiner

*Primary Examiner* — Yalkew Fantu
*Assistant Examiner* — Mohammed J Sharief
(74) *Attorney, Agent, or Firm* — Morris & Kamlay LLP (57) ABSTRACT

An electronic device is provided, including a housing having a back surface. The device includes a rechargeable battery, a capacitor, an inductor coil connected to the capacitor, the inductor coil being disposed around an axis oriented perpendicular to the back surface, a rectifier circuit connected to the inductor coil to output a direct current (DC), a DC-DC converter connected to the rectifier circuit, configured to trickle charge the battery with current received from the rectifier circuit, a test load switchably connected to the DC-DC converter, and a feedback circuit configured to detect a voltage level of the test load and provide an indication of the voltage level.

5 Claims, 7 Drawing Sheets

METHODS AND DEVICES FOR INDUCTIVE COUPLING INTO POWER LINES

BACKGROUND

Electronic devices in a premises that monitor safety, security, climate control, etc., are often mounted on walls in the premises and require power. Users typically prefer not to run wires to the devices from outlets for power. However, if batteries are used to power the devices, the user must periodically change the batteries. In some circumstances a device may be nonfunctional during a critical time due to lack of power from a dead battery that has not yet been changed. If, instead of batteries, a custom power delivery system is used involving splicing wires behind walls to power the devices, then professional installation is often required, which can be expensive for the user.

BRIEF SUMMARY

According to an embodiment of the disclosed subject matter, an electronic device including a housing having a back surface, includes a rechargeable battery, a capacitor, an inductor coil connected to the capacitor, the inductor coil being disposed around an axis oriented perpendicular to the back surface, a rectifier circuit connected to the inductor coil to output a direct current (DC), a DC-DC converter connected to the rectifier circuit, configured to trickle charge the battery with current received from the rectifier circuit, a test load switchably connected to the DC-DC converter, and a feedback circuit configured to detect a voltage level of the test load and provide an indication of the voltage level.

According to another embodiment of the disclosed subject matter, a method of inductive charging an electronic device using powerlines disposed in a premises, includes detecting, with the electronic device, a magnetic field generated by current in a powerline within a wall of the premises at a first location, determining a power generation level that the electronic device can achieve from inductive charging at the first location, moving the electronic device to a second location, providing, while the electronic device is moving, feedback indicating a level of power generation achievable via induction from the powerline, attaching the electronic device to the wall at a position on the wall where the indicated level of power generation is above a threshold value, and trickle-charging a rechargeable battery in the device using an inductive charging power circuit disposed in the electronic device.

According to an embodiment of the disclosed subject matter, means for inductive charging an electronic device using powerlines disposed in a premises, including detecting, with the electronic device, a magnetic field generated by current in a powerline within a wall of the premises at a first location, determining a power generation level that the electronic device can achieve from inductive charging at the first location, moving the electronic device to a second location, providing, while the electronic device is moving, feedback indicating a level of power generation achievable via induction from the powerline, attaching the electronic device to the wall at a position on the wall where the indicated level of power generation is above a threshold value, and trickle-charging a rechargeable battery in the device using an inductive charging power circuit disposed in the electronic device are provided.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosed subject matter can be practiced without these specific details, or with other methods, components, materials, etc. In other instances, well-known structures and devices are shown in block diagram form to facilitate describing the subject disclosure.

Electrical power distribution systems commonly used in the United States and other countries distribute electrical power from a source to outlets, lights, etc., in a premises via alternating current (AC) at 60 Hz over cables attached to studs and/or beams disposed behind walls. The embodiments disclosed herein include electronic devices configured to draw power from the cables using inductive charging techniques and configured to aid the user in an installation process so that professional assistance is not required.

Figure 1:
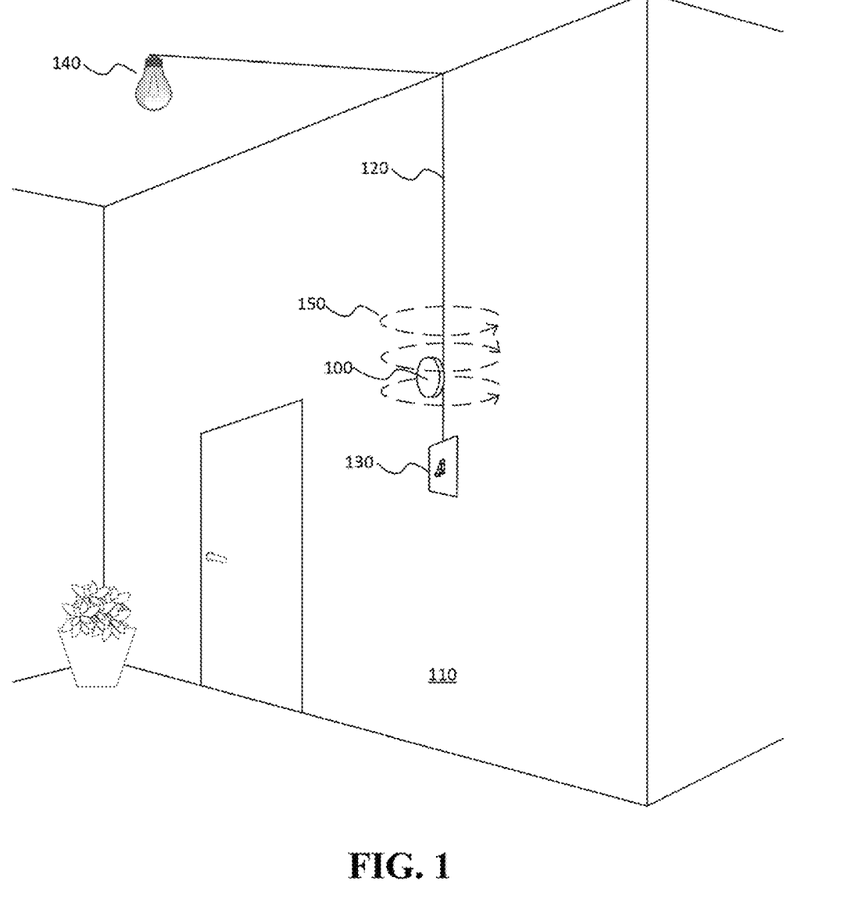
FIG. 1 shows an electronic device mounted on a wall according to an embodiment of the disclosed subject matter.

FIG. 1 shows an example use case for a disclosed embodiment that has been installed in a premises. An electronic device 100 (in this example, a thermostat) is mounted on a wall 110. Behind the wall 110, a powerline 120 connects a switch 130 to a light 140. When the switch 130 is closed, an alternating current flows through the powerline 120, causing the light 140 to turn on. The alternating current flow creates an alternating electromagnetic field 150 around the powerline 120. The electronic device 100 is mounted on the wall 110 in a position that allows the device 100 to generate power from the alternating electromagnetic field 150.

A typical incandescent lightbulb draws approximately 50 W, and a single light switch normally supplies two or more lightbulbs, so the light switch power line will conservatively carry 100 W or more of power. For a low power electronic device that draws approximately 100 µW on average, an coupling efficiency of $10^{-6}$ can be sufficient to power the device indefinitely. A low coupling efficiency requirement allows the coil to be highly suboptimal, allowing for the use of smaller coils and coil inductances/matching capacitances. A low coupling efficiency requirement also allows the use of different shaped coils, and allows larger distances between the power source and the device than normally allowed by wireless charging systems.

Figure 2:
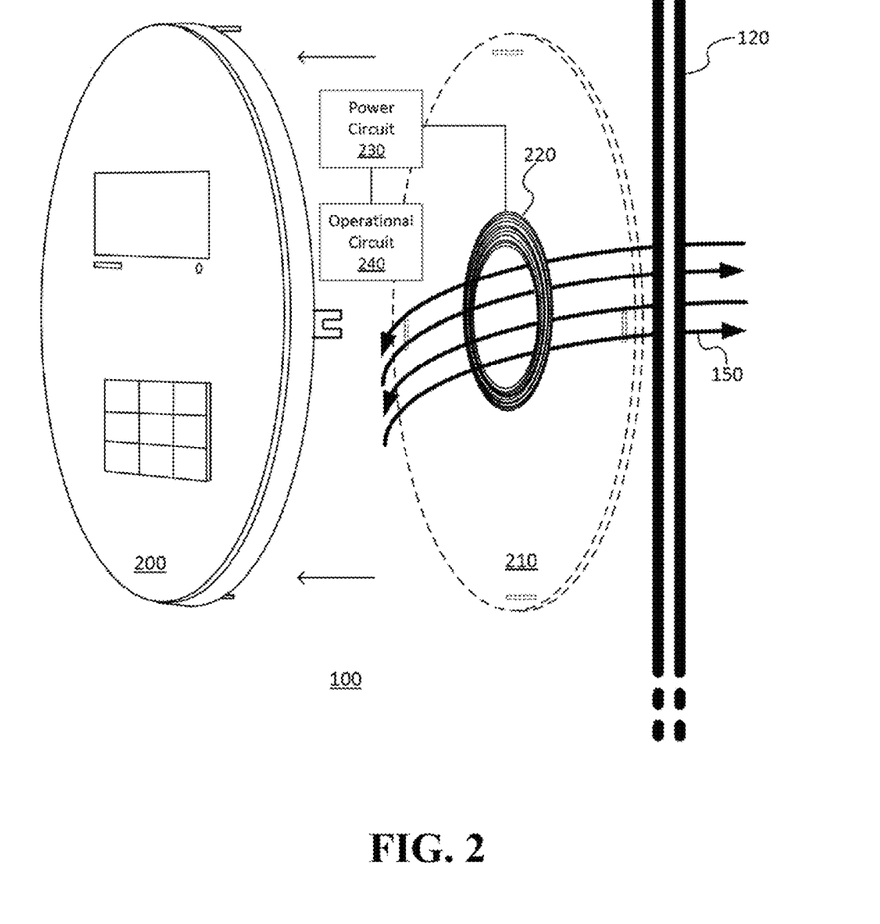
FIG. 2 shows an interior view of an electronic device according to an embodiment of the disclosed subject matter.

FIG. 2 shows an interior view of the electronic device 100, including a front surface 200, a back surface 210, an inductor coil 220, a power circuit 230 and an operational circuit 240. The front surface 200 is shown removed in the direction of the straight arrows. The inductor coil 220 is disposed on the back surface 210. When the device 100 is placed in close proximity to the alternating electromagnetic field 150 surrounding the powerline 120, the inductor coil 220 generates an alternating current that is captured by the power circuit 230 and transmitted to the operational circuit 240. The operational circuit 240 can be configured to handle any of various tasks, as will be described further below.

Figure 3:
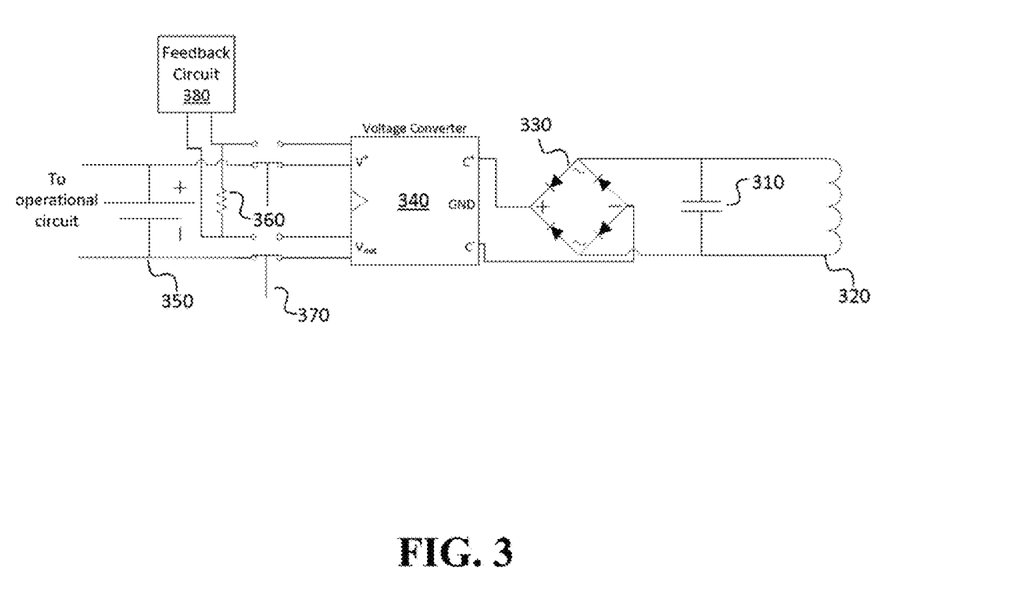
FIG. 3 shows a power circuit according to an embodiment of the disclosed subject matter.

The power circuit 230 will now be further described. FIG. 3 shows a diagram of an embodiment of a power circuit 230 according to the disclosed subject matter. The configuration shown includes a capacitor 310, an inductor coil 320, a rectifier circuit 330, a converter circuit 340, a rechargeable battery 350, a test load 360, a switch mechanism 370, and a feedback circuit 380. It should be understood that the configuration of the power circuit 230 can be modified, and other components may be included that are not illustrated.

In one embodiment the inductor coil 320 comprises a four-inch coil with sixty turns, however, other configurations of coils can be used. The capacitor 310 is selected to tune the inductor coil 320 to a predetermined resonant frequency. In one embodiment, the capacitor 310 is selected to achieve a resonant frequency of, or close to, 60 Hz, which is a standard AC frequency for powerlines in many locations. In one embodiment, the coil 320 can be configured to achieve an inductance of around 700 mH, and the capacitor can be selected to have a capacitance of around 10 mF. In this embodiment, the circuit can have a Q of around 100. Generally, configuring the circuit to have a high Q increases the amount of power that can be generated.

The rectifier circuit 330 rectifies the current generated by the inductor coil 320 and the converter circuit 340 and trickle-charges the battery 350 by converting the current to an appropriate voltage for charging the battery 350. The battery 350 provides power to the operational circuitry of the device.

The switch 370 can be switched from a first position that connects the converter 340 to the battery 350, to a second position that disconnects the converter 340 from the battery 350 and connects the converter 340 to a test load 360. The feedback circuit 380 detects the voltage across the test load 360 and provides an indication of the voltage level to the user, as will be discussed further below.

Figure 4:
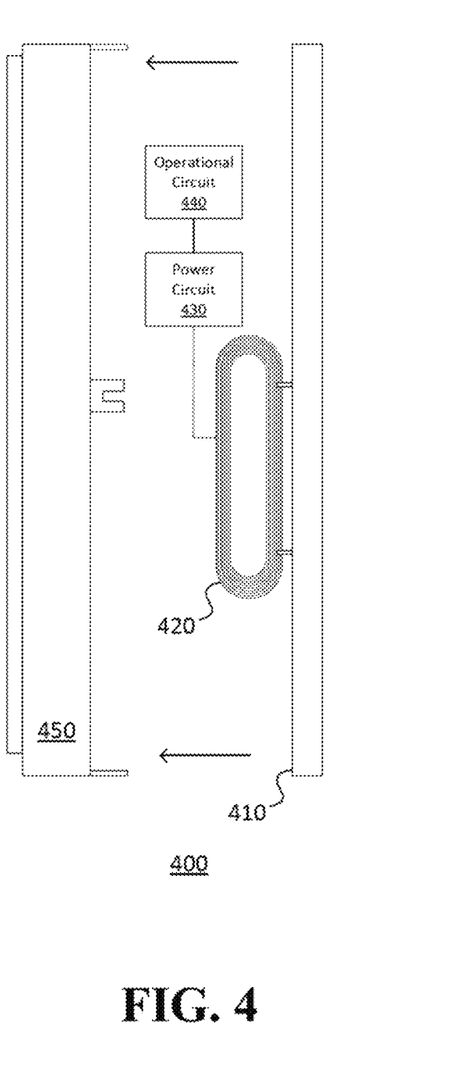
FIG. 4 shows an inductor configuration in electronic device according to an embodiment of the disclosed subject matter.

The size, shape, and orientation of the coil can be altered in different implementations. Furthermore, the number of coils can also be altered. FIG. 4 shows an in inductor coil configuration in an embodiment of an electronic device 400, including a front surface 450, a back surface 410, a power circuit 430 and an operational circuit 440. Elements that have already been previously described will not be further discussed here. In this embodiment, the inductor coil 420 is oriented around an axis that is parallel to the back surface 410. Depending on the size of the device and the components required for the operational circuit, this configuration can provide a different option for the interior positioning of elements.

Figure 5:
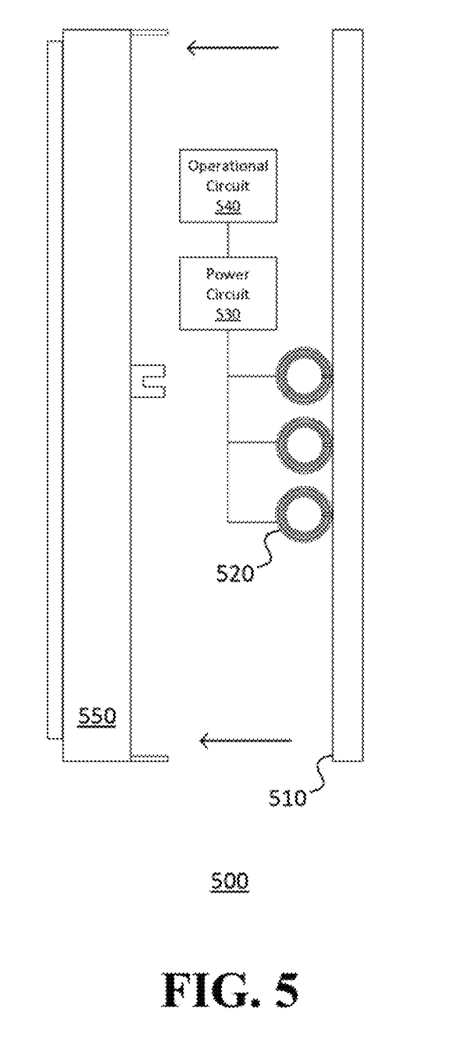
FIG. 5 shows another inductor configuration in electronic device according to an embodiment of the disclosed subject matter.

FIG. 5 shows another inductor coil configuration in an embodiment of an electronic device 500 including a front surface 550, a back surface 510, a power circuit 530, and an operational circuit 540. This embodiment includes a plurality of inductor coils 520.

As described above, the operational circuit executes functional tasks that the device is designed to handle. For example, in one embodiment the operational circuit can include a keypad input unit configured to receive input from a user and a network interface unit configured to transmit a security signal to an external computing device based on a code entered in the keypad input unit. Both the keypad input unit and the network interface unit can be powered by the battery in the power circuit. In this embodiment the device can function as a security keypad entry unit.

In another embodiment, the operational circuit can include one or more temperature sensors to measure ambient temperature, a user interface unit configured to receive input to control a heating, ventilation and air conditioning (HVAC) system, a network interface unit configured to transmit a control signal encoding a system command to control the HVAC system based on the received input, and a display unit configured to display information related to the HVAC system. The one or more temperature sensors, interface unit and display unit can be powered by a battery in the power circuit, where the battery is rechargeable using the apparatuses and methods described herein. In this embodiment the device can function as a thermostat.

In another embodiment, the operational circuit can include an image sensing array configured to capture digital images, a processor configured to drive the image sensing array, and a memory configured to store images captured by the image sensing array. The image sensing array, the processor and the memory can be powered by the battery in the power circuit, where the battery is rechargeable using the apparatuses and methods described herein.

Figure 6:
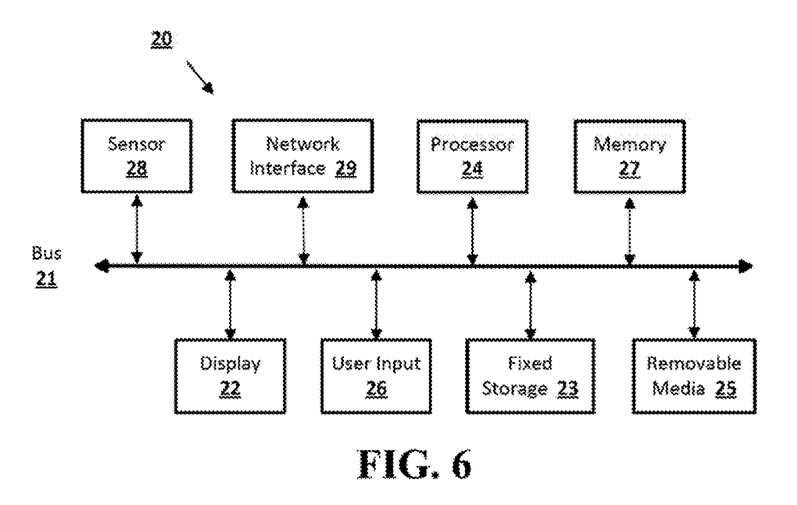
FIG. 6 shows an operational circuit in an electronic device according to an embodiment of the disclosed subject matter.

FIG. 6 shows a general example embodiment of an operational circuit 20. The operational circuit 20 can include a bus 21 which interconnects components, such as a central processor 24; a memory 27 such as Random Access Memory (RAM), Read Only Memory (ROM), flash RAM, or the like; a user display 22 such as a display screen or one or more light emitting diodes (LEDs); a user input interface 26, which may include one or more controllers and associated user input devices such as a keyboard, mouse, touch screen, and the like; and a network interface 29 operable to communicate with one or more external devices via a suitable network connection. The circuit 20 may also include one or more sensors 28, a fixed storage 23 such as a hard drive, flash storage, or the like, and/or a removable media component 25 operative to control and receive a memory card, optical disk, flash drive, or the like.

The bus 21 allows data communication between the central processor 24 and one or more memory components, which may include RAM, ROM, and other memory, as previously noted. Typically RAM is the main memory into which an operating system and application programs are loaded. A ROM or flash memory component can contain, among other code, the Basic Input-Output system (BIOS) which controls basic hardware operation such as the interaction with peripheral components.

The fixed storage 23 may be integral with the device or may be separate and accessed through other interfaces. The network interface 29 can provide a direct connection to a remote server, system or other device via a wired or wireless connection. The network interface 29 may provide such connection using any suitable technique and protocol as will be readily understood by one of skill in the art, including digital cellular telephone, WiFi, Bluetooth®, Thread®, near-field communication, and the like. For example, the network interface 29 may allow the device to communicate with other devices or computers via one or more local, wide-area, or other communication networks, as described in further detail below.

The sensor 28 can be implemented as, for example, a digital imager, pixel array, temperature sensor, microphone, passive infrared detector, or other type of sensor that captures data that indicates information about an environment that the device is in.

Other devices or components (not shown) may be connected to the operational circuitry in a similar manner, depending on the functionality of the device. Conversely, all of the components shown in FIG. 6 need not be present to practice the present disclosure. The components can be interconnected in different ways from the configuration shown. The software aspect of operation of a device such as that shown in FIG. 6 is not discussed in detail in this application. Code to implement various features of the present disclosure can be stored in computer-readable storage media such as one or more of the memory 27, fixed storage 23, removable media 25, or on a remote storage location and accessible via the network interface 29.

Figure 7:
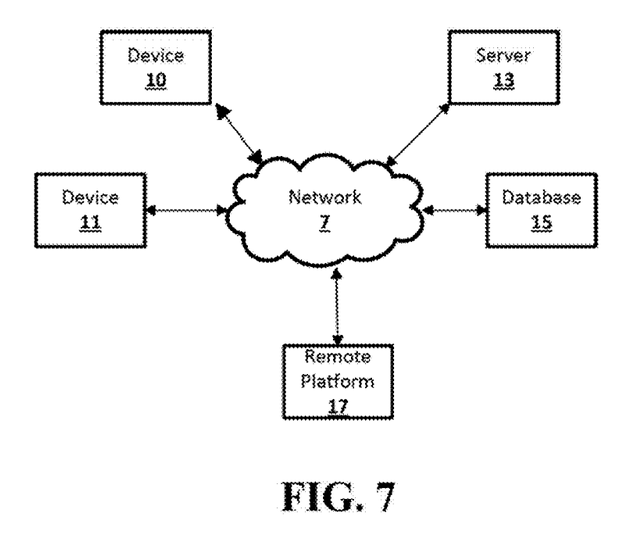
FIG. 7 shows a network configuration according to an embodiment of the disclosed subject matter.

FIG. 7 shows an example network arrangement according to an embodiment of the disclosed subject matter. One or more disclosed devices 10, 11, such as security keypads, smart thermostats, security sensors, or the like may connect to other devices via one or more networks 7. Each device may be a device including a power circuit inductively coupled to a powerline in a wall of a premises as previously described. The network may be a local network, wide-area network, the Internet, or any other suitable communication network or networks, and may be implemented on any suitable platform including wired and/or wireless networks. The devices may communicate with one or more remote devices, such as servers 13 and/or databases 15. The remote devices may be directly accessible by the devices 10, 11, or one or more other devices may provide intermediary access such as where a server 13 provides access to resources stored in a database 15. The devices 10, 11 also may access remote platforms 17 or services provided by remote platforms 17 such as cloud computing arrangements and services. The remote platform 17 may include one or more servers 13 and/or databases 15.

Figure 8:
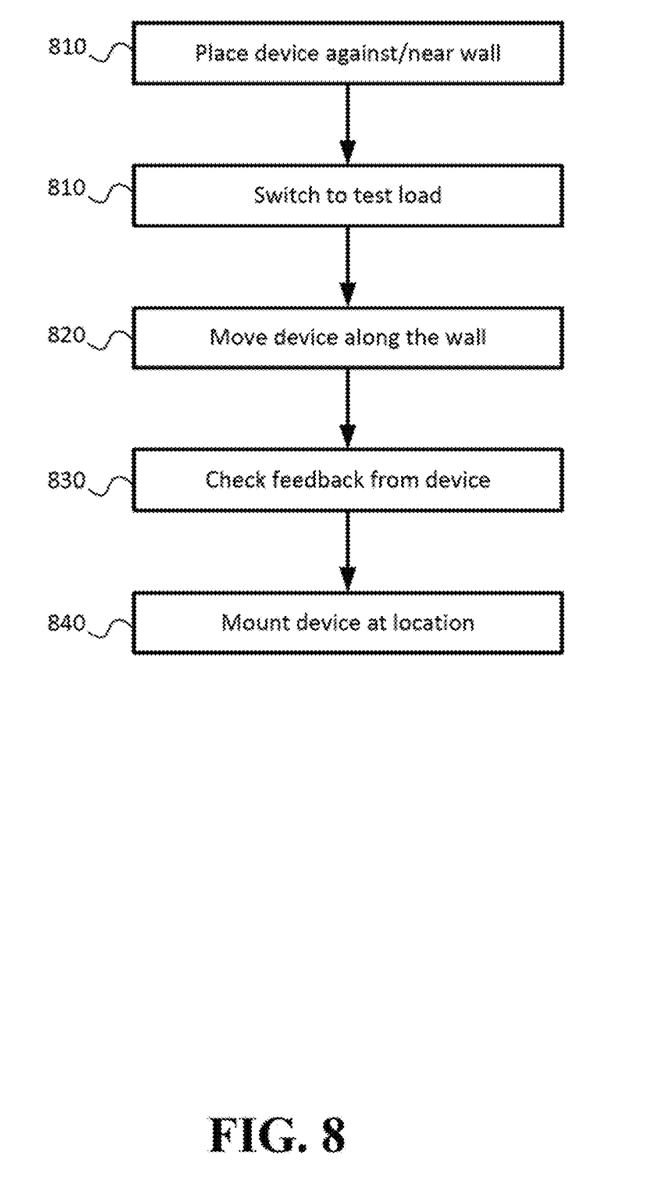
FIG. 8 shows a flowchart of an installation process according to an embodiment of the disclosed subject matter.

Since the precise location of powerlines within a wall may be unknown to the user, the disclosed electronic device can include a locator feature to aid a user in finding a location to install the device. FIG. 8 shows a process 800 of a feedback locator feature that the disclosed device can implement.

At operation 810 the user places the device against or near the wall. At operation 820 the device is switched to test mode in which the converter is disconnected from the battery and switched to be connected to a test load (see FIG. 3). The switch to test mode can occur manually, for example, via the user manually moving a switch or pressing a button, or automatically, for example by the device including a mechanical switch that is configured to switch from a first position to a second locked position when a back surface of the device is pressed against a wall and remain locked until released to return to the first position.

In operation 830, while the device is in test mode the user moves the device along the wall. The user can be instructed, for example, to place the device on the wall near a light switch, as shown in FIG. 1, turn the light switch on to ensure that current is flowing in the powerline, and slide the device back and forth. While the device is moving the inductor will move through an alternating electromagnetic field created by the current in the powerline. The feedback circuit provides an indication of the amount of power that the power circuit is generating at each location.

The feedback circuit can be implemented in various configurations to provide the power indication. For example, in one embodiment the feedback circuit can include a plurality of light emitting diodes (LEDs) in varying colors that are configured to illuminate at increasing power level thresholds. For example, a red LED illuminates at a low power level, a yellow LED illuminates at a higher power level, and a green LED illuminates at a power level above a predetermined threshold that is sufficient to charge the battery and power the device.

In another embodiment, the feedback circuit can include a transmitter configured to transmit an encoded signal to an external device, such as a cell phone or a computer. The signal can be encoded to indicate the detected power level. The external device can be configured to decode the signal and display a value or provide an audible indication of the value.

In another embodiment, the feedback circuit can include a speaker that is configured to give an audible indication of the power level. For example, the speaker can be configured to beep at an increasing frequency as the power level increases and at a decreasing frequency as the power level decreases.

At operation 840 the user mounts the device on the wall based on the power level indication provided by the feedback unit.

Accordingly, the disclosed device can be powered or recharged by inductive coupling, reducing the need for frequent battery changes and eliminating the need for professional installation.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a system as disclosed herein.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as flash drives, CD-ROMs, hard drives, USB (universal serial bus) drives, or any other machine readable storage medium, such that when the computer program code is loaded into and executed by a computing/smart device, the computing/smart device becomes an apparatus for implementing embodiments of the disclosed subject matter. Embodiments also may be embodied in the form of computer program code, for example, whether stored in a storage medium, loaded into and/or executed by a computing/smart device, or transmitted over some transmission medium, such as over electrical wiring or cabling, through fiber optics, or via electromagnetic radiation, such that when the computer program code is loaded into and executed by a computing/smart device, the computing/smart becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer- readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method of inductive charging an electronic device using a powerline disposed in a premises, comprising:
   detecting, with the electronic device, a magnetic field generated by current in the powerline within a wall of the premises at a first location;
   determining a power generation level that the electronic device can achieve from inductive charging at the first location;
   moving the electronic device to a second location;
   providing, while the electronic device is moving, feedback indicating a level of power generation achievable via induction from the powerline;
   attaching the electronic device to the wall at a position on the wall where the indicated level of power generation is above a threshold value; and
   trickle-charging a rechargeable battery in the device using an inductive charging power circuit disposed in the electronic device.

2. The method of claim 1, wherein determining the power generation level comprises:
   disconnecting the battery from the inductive charging power circuit;
   connecting the inductive charging power circuit to a known load;
   measuring a voltage across the load; and
   determining the power generation level based on the voltage drop.

3. The method of claim 1, wherein providing the feedback indicating the level power generation comprises illuminating a plurality of light emitting diodes in varying colors, including a first color that indicates a low power generation level and a second color that indicates a high power generation level.

4. The method of claim 1, wherein providing feedback indicating the level of power generation comprises transmitting a digitally encoded signal to an external computing device, the digitally encoded signal indicating a value representing an amount of the generated power.

5. The method of claim 1, wherein providing feedback indicating the level of power generation comprises providing a range of audible sounds including a first audible sound that indicates a low power generation level and a second audible sound that indicates a high power generation level.

* * * * *